Patented Aug. 10, 1954

2,686,176

UNITED STATES PATENT OFFICE 2,686,176

NEW CUPRIFEROUS TRISAZO DYESTUFFS

Raymond Gunst, Binningen, Switzerland, assignor to Ciba Limited, Basel, Switzerland, a Swiss firm No Drawing. Application February 2, 1953, Serial No. 334,713

Claims priority, application Switzerland August 25, 1949

7 Claims. (Cl. 260—146)

This application is a continuation in part of my copending application Serial No. 180,697, filed August 21, 1950. The present invention is based on the observation that the cupriferous trisazo dyestuffs of the formula (1)
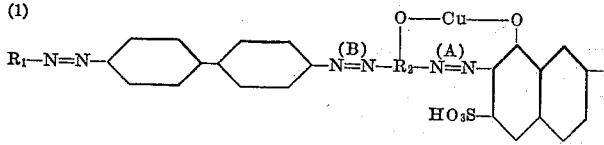

are very valuable dyestuffs. The molecule of these dyestuffs contains a single complex-bound copper atom and in the Formula 1, $R_1$ represents a benzene radical containing a hydroxyl group in para-position with respect to the azo group and a carboxylic acid group in ortho-position to the hydroxyl group, and $R_2$ represents a benzene or naphthalene radical to which the groups

—O—Cu— and

are bound in 1:2:4-position.

The cupriferous trisazo dyestuffs of the Formula 1 can be obtained by subjecting trisazo dyestuffs which correspond to the formula (2)
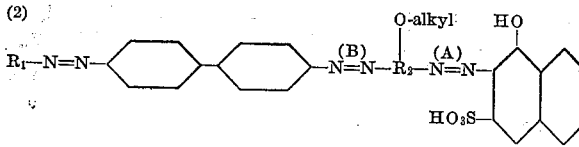

in which $R_1$ has the meaning given above and $R_2$ represents a benzene or naphthalene radical to which the groups

—O-alkyl and

are bound in 1:2:4-position, to the action of an agent providing copper, under conditions such that splitting up of the —O-alkyl groups takes place with the formation of the ortho:ortho'-dihydroxyazo copper complexes.

The trisazo-dyestuffs of the Formula 2 can be obtained as follows: tetrazotized 4:4'-diaminodiphenyl is coupled on one side in a medium rendered alkaline with alkali carbonate with a hydroxybenzene-ortho-carboxylic acid capable of coupling, such as for example 6-methyl-1-hydroxybenzene-2-carboxylic acid or 1-hydroxy-benzene-2-carboxylic acid itself. The so-obtained diazo azo compound is then coupled in an acid medium with a 1-amino-benzene or a 1-aminonaphthalene containing in its 2-position an alkoxy group of low molecular weight such

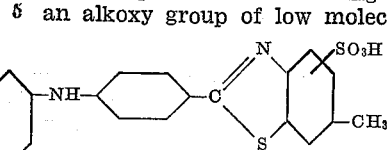

as for example an ethoxy or a methoxy group. The amino disazo dyestuffs thus obtained are then diazotized and coupled with 2-[4'-(8''-hydroxynaphthyl-[2'']-aminophenyl)]-6-methyl-benzthiazole-X:6''-disulfonic acid. As amines yielding the radical

there come into consideration amines of the benzene series, such as 1-amino-2-methoxy-benzene or 1-amino-2:5-dimethoxy-benzene, and also amines of the naphthalene series, such as for instance 1-amino-2-methoxy- or -ethoxynaphthalene and especially 1-amino-2-alkoxy-naphthalene-6- or -7-sulfonic acids. A method for the preparation of 2-[4'-(8''-hydroxynaphthyl-[2'']-aminophenyl)]-6-methyl-benzthiazole-X:6''-disulfonic acid corresponding to the formula

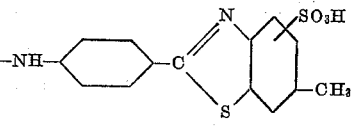

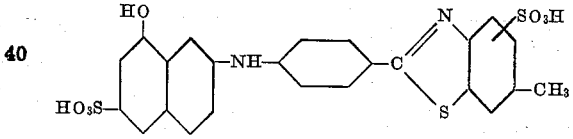

is given in example below.

According to the present invention the trisazo dyestuffs of the Formula 2 are to be treated in such a way with an agent providing copper that with splitting up of the alkoxy group bound to the radical $R_2$ the corresponding ortho:ortho'-dihydroxy copper complex is produced which contains a single atom of complex-bound copper in the dyestuff molecule, and therefore contains no copper bound in complex union with the radical $R_1$. For this reason it is of advantage to employ per molecular proportion of dyestuff about the quantity of the agent providing copper which contains one gram atom of copper. Methods which lead to a dealkylating coppering are known. In many cases that process has proved especially suitable according to which, with the application of copper tetrammine complexes in the presence or absence of an excess of ammonia or an organic base, such as pyridine or ethanolamine, the coppering is carried out in an aqueous medium for several hours at a temperature in the neighborhood of 100° C.

With regard to the formulae of the cupriferous dyestuffs it should be explained that these formulae undoubtedly represent the correct stoichiometric quantities of copper and the correct position of the copper atom in the complex, but the distribution of the main and secondary valences in the complex union of the copper has not yet been established with certainty.

The new cupriferous trisazo dyestuffs of the Formula 1 can be employed for the dyeing and printing of a wide variety of materials, such as wool and silk, but especially fibers containing cellulose, such as cotton, linen and also artificial silk and staple fibers of regenerated cellulose. Very interesting shades are obtained of very good fastness to light.

In the following example the parts and percentages are by weight unless otherwise stated, the relation between parts by weight and parts by volume being the same as that between the kilogram and the liter.

*Example*

18.4 parts of 4:4'-diaminodiphenyl are tetrazotized in known manner and the tetrazo compound is coupled with 15 parts of 1-hydroxybenzene-2-carboxylic acid in an aqueous medium alkaline with sodium carbonate. Acetic acid is added to the so-obtained yellowish-brown suspension until it reacts weakly acid to litmus paper and the diazo-azo compound is then coupled with 25.3 parts of 1-amino-2-methoxynaphthalene-6-sulfonic acid. The disazo-dyestuff is then filtered off and suspended again in 1600 parts of water. Then 7.5 parts of sodium nitrite are added and diazotization is brought about by adding 60 parts of hydrochloric acid of 30 per cent. strength at 5-10° C. The sparingly soluble diazo compound is filtered off, suspended again in water and then coupled with 55 parts of 2-[4'-(8" - hydroxynaphthyl-[2"] - aminophenyl)]-6-methyl-benzthiazole-X:6"-disulfonic acid in the presence of 30 parts of sodium carbonate and 150 parts of pyridine. The trisazo dyestuff is salted out with sodium chloride, filtered off and separated from any impurities better soluble than the dye by washing it with diluted sodium chloride solution.

In order to transform it into the complex copper compound the trisazo dyestuff is dissolved in 1400 parts of water and 100 parts of pyridine, an aqueous ammoniacal solution of cupric tetrammine sulfate, the copper content of which corresponds to 25 parts of crystallized copper sulfate, is added and the whole is stirred for 5 hours at 90–95° C. By carefully neutralizing the reaction mixture by the addition of hydrochloric acid the complex copper compound of the formula

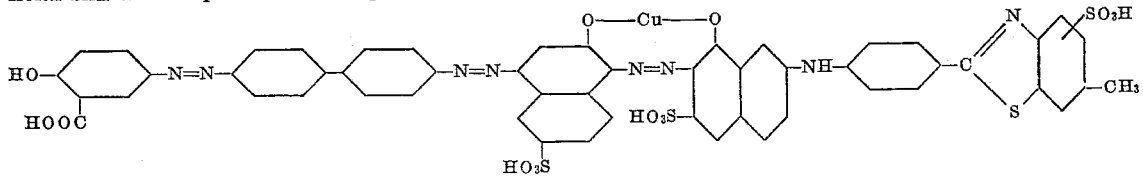

precipitates. It is filtered off and dried and then forms a dark powder which dissolves in water with a greyish green coloration and dyes cellulosic fibers olive tints having good fastness properties.

Dyestuffs of similar properties are obtained when, in the present example, 6-methyl-1-hydroxybenzene-2-carboxylic acid is used instead of 1-hydroxybenzene-2-carboxylic acid or when the 1-amino-2-methoxynaphthalene - 6 - sulfonic acid is replaced by 1-amino-2-methoxynaphthalene-7-sulfonic acid. These dyestuffs correspond to the formulae

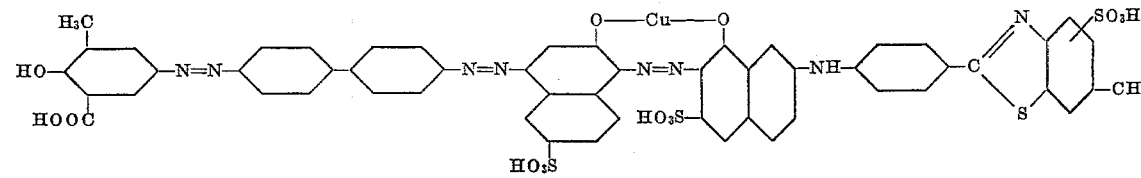

and

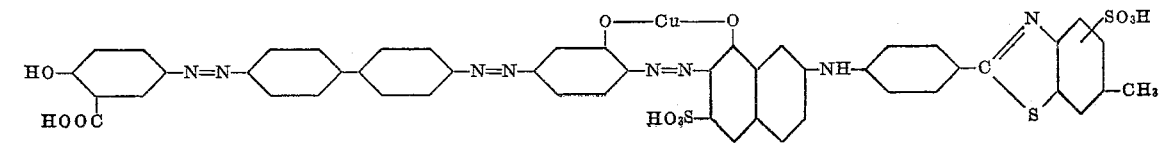

Dyestuffs of similar properties but yielding brown tints with an olive cast are obtained, when in the present example 1-amino-2-methoxynaphthalene sulfonic acid is replaced by 1-amino-2-methoxybenzene or 1-amino-2:5-dimethoxybenzene. These dyestuffs correspond to the formulae

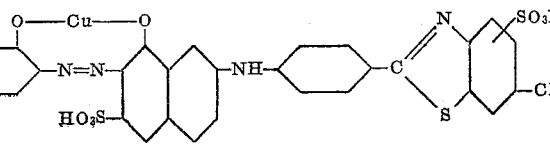

and

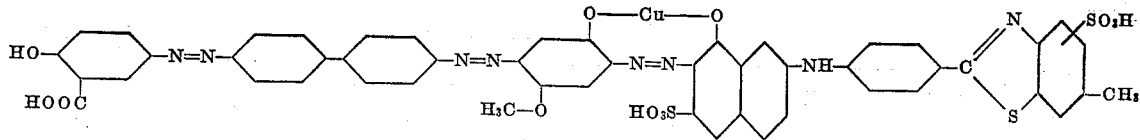

The 2-[4'-(8"-hydroxynaphthyl-[2"]-aminophenyl)] - 6 - methyl - benzthiazole-X:6"-disulfonic acid used as starting material in this example can be produced as follows:

24.0 parts of 1:7-dihydroxynaphthalene-3-sulfonic acid are suspended in 500 parts of commercial sodium bisulfite solution. At 95° C., 46 parts of 2 - (4' - aminophenyl) - 6 - methyl-benzthiazole-X-sulfonic acid (obtained by sulfonation of 2 - (4' - aminophenyl)-6-methyl-benzthiazole with fuming sulfuric acid) are introduced and the reaction mixture is maintained for 60 hours with stirring and reflux cooling at 95–97° C. After cooling, the condensation product which is difficultly soluble in acid solution, is

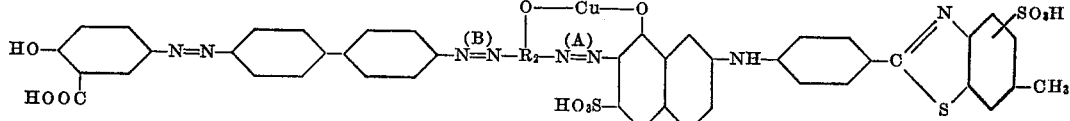

filtered off. For purification the filter residue is dissolved in the hot in a medium alkaline with sodium carbonate and freed from any insoluble residue by filtration. By addition of dilute hydrochloric acid the condensation product is precipitated as an orange-brown deposit. If desired the condensation product can be freed from sulfurous acid by heating the suspension, until the sulfurous acid has completely evaporated.

What is claimed is:

1. A cupriferous trisazo dyestuff containing a single-copper atom bound in complex union with the dyestuff molecule and corresponding to the formula

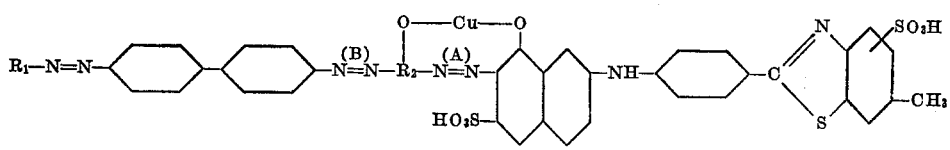

in which $R_1$ represents a benzene radical containing a hydroxyl group in para-position with respect to the azo group and a carboxylic acid group in ortho-position to the hydroxyl group, and $R_2$ represents a mononuclear aromatic radical containing at the most two condensed rings and to which the groups

  —O—Cu— and

are bound in 1:2:4-position.

2. A cupriferous trisazo dyestuff corresponding to the formula

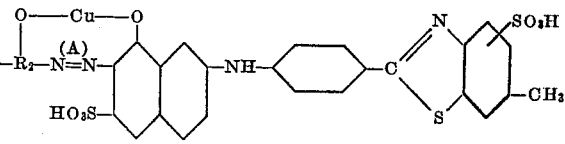

wherein $R_2$ represents a benzene radical to which the groups

  —O—Cu— and

are bound in 1:2:4-position.

3. A cupriferous trisazo dyestuff corresponding to the formula

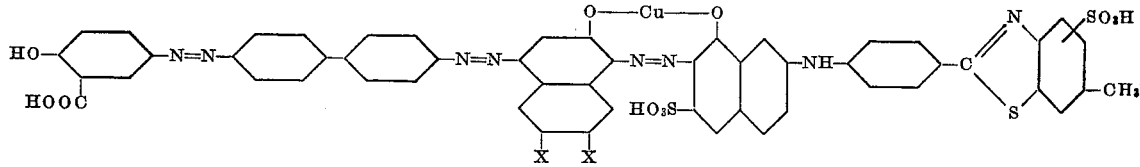

wherein one X stands for hydrogen and the other X stands for a sulfonic acid group.

4. The cupriferous trisazo dyestuff of the formula

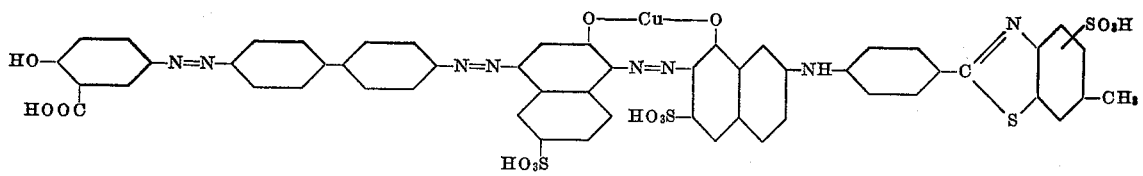

5. The cupriferous trisazo dyestuff of the formula

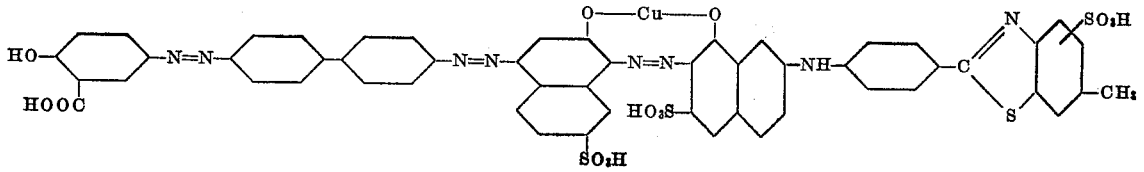

6. The cupriferous trisazo dyestuff of the formula
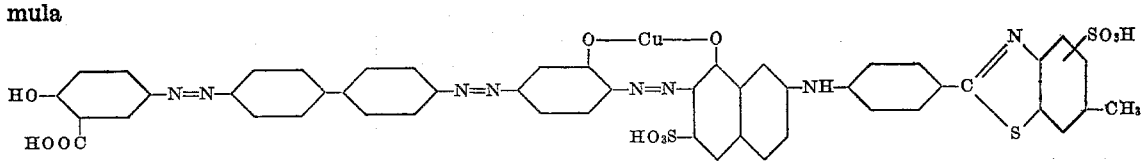
7. The cupriferous trisazo dyestuff of the formula
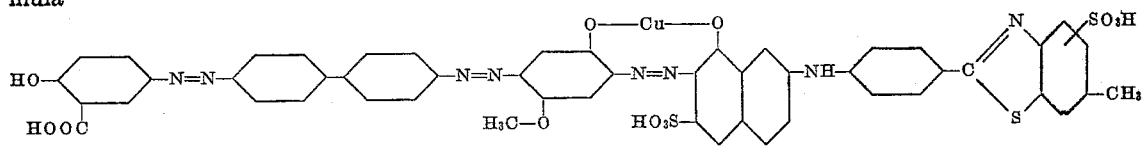
No references cited.